US005543957A

United States Patent [19]
Koui et al.

[11] Patent Number: 5,543,957
[45] Date of Patent: Aug. 6, 1996

[54] OPTICAL MODULATOR AND METHOD OF PRODUCING THE SAME

[75] Inventors: Tomoaki Koui; Shinji Takano, both of Tokyo, Japan

[73] Assignee: NEC Corporation, Tokyo, Japan

[21] Appl. No.: 358,622

[22] Filed: Dec. 14, 1994

[30] Foreign Application Priority Data

Dec. 20, 1993 [JP] Japan ................................. 5-319547

[51] Int. Cl.$^6$ ................................................. G02F 1/03
[52] U.S. Cl. ................................. 359/245; 359/246
[58] Field of Search ........................ 359/245, 246

[56] References Cited

U.S. PATENT DOCUMENTS

| | | | |
|---|---|---|---|
| 5,017,974 | 5/1991 | Greene | 357/4 |
| 5,047,822 | 9/1991 | Little, Jr. et al. | 357/30 |
| 5,165,105 | 11/1992 | Haase et al. | 385/8 |
| 5,339,370 | 8/1994 | Sano et al. | 385/2 |
| 5,354,679 | 10/1994 | Tanaka et al. | 385/8 |
| 5,381,023 | 1/1995 | Komatsu | 257/87 |

FOREIGN PATENT DOCUMENTS

| | | |
|---|---|---|
| 0472221 | 2/1992 | European Pat. Off. . |
| 4-303982 | 10/1992 | Japan . |

OTHER PUBLICATIONS

Lecture No. C–152, Spring Meeting of the Electronic Information Communication Society of Japan, 1993.
T. Kato et al., "DFB–LD/Modulator Integrated Light Source By Bandgap Energy Controlled Selective MOVPE", Electronic Letters, Jan. 16, 1992, vol. 28, No. 2, pp. 153–154.
K. Komatsu et al., "Semiconductor External Modulators For 2.5 Gb/s Optical Transmission Using Selective Growth by MOVPE", Optoelectronics, Jun. 1994, vol. 9, No. 2, pp. 241–250.

*Primary Examiner*—Mark Hellner
*Attorney, Agent, or Firm*—Young & Thompson

[57] ABSTRACT

The invention realizes an optical modulator which prevents occurrence of an edge breakdown and is improved in extinction characteristic and voltage resisting property. The optical modulator comprises an oxide film formed as a growth inhibiting film on a compound semiconductor substrate of a first conduction type, a double heterostructure including a clad layer of the first conduction type, a light absorbing layer and a clad layer of a second conduction type successively formed in an opening of the oxide film, and an embedding structure for covering over the entire double heterostructure. The optical modulator is characterized in that the carrier concentration of the clad layer of the first conduction type exhibits a continuous variation from the semiconductor substrate to the light absorbing layer or the carrier concentration of the embedding structure portion exhibits a variation from a low concentration to a high concentration.

8 Claims, 9 Drawing Sheets

OPTICAL MODULATOR AND METHOD OF PRODUCING THE SAME

BACKGROUND OF THE INVENTION

1. Field of the Invention

This invention relates to an optical modulator, and more particularly to a semiconductor optical modulator and a method of producing the semiconductor optical modulator.

2. Description of the Invention

Very high speed, large capacity transmission and information processing equipment optical communications technology is being developed rapidly, and in optical communications, a semiconductor laser output is modulated to effect transmission.

However, when a semiconductor laser is modulated directly in an optical transmission in the 1.5 μm band at a rate higher than 1 Gbit/sec, a wavelength shift of the refraction index, that is, so-called wavelength chirping, is caused by variation in the refraction index arising from variation in carrier concentration in an active layer, restricting the communication distance. Much attention has been paid to the problem, and much effort directed to realizing an external modulator as a countermeasure to reduce the influence of wavelength chirping.

Figure 1A:
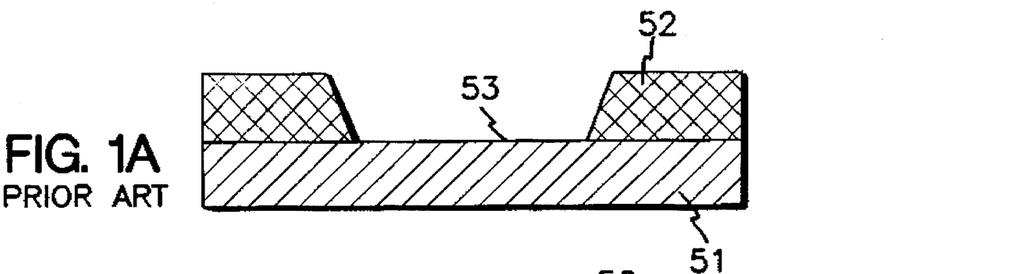
FIGS. 1a to 1d are sectional views showing different steps of production of an optical modulator by the prior art.
Figure 1B:
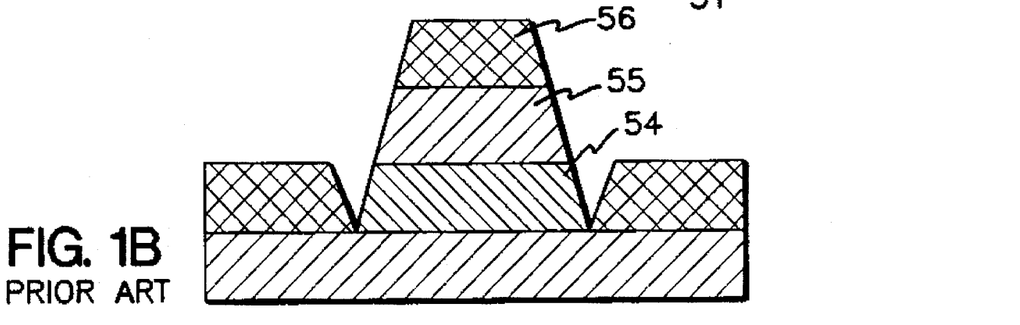
Figure 1C:
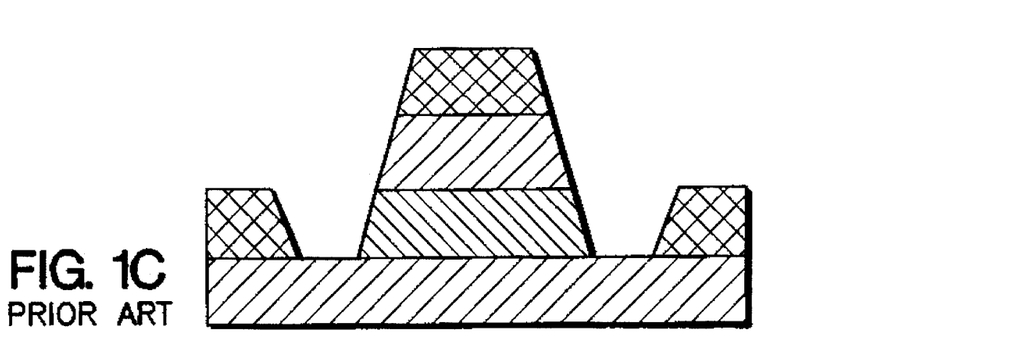
Figure 1D:
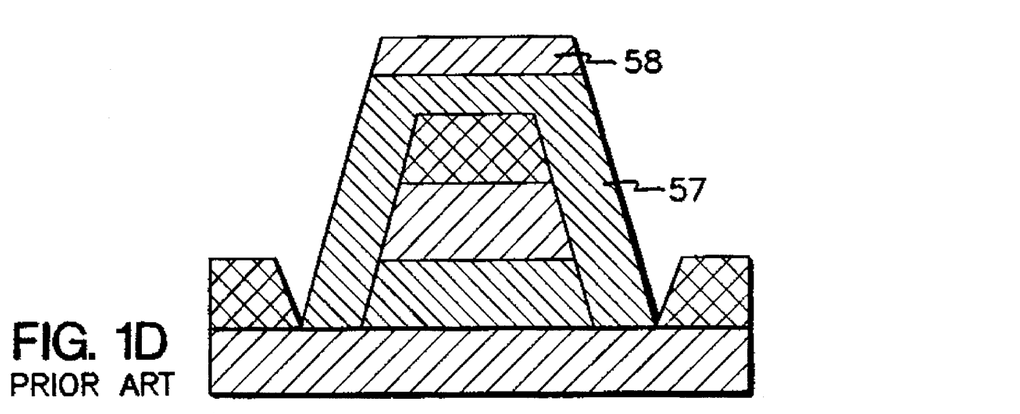

One such optical modulator is a bulk structure modulator of the electric field absorbing type which employs a bulk semiconductor for a light absorbing layer and makes use of an absorbing end variation by a Franz-Keldysh (F-K) effect as disclosed, for Example, in the Lecture No. C-152, Spring Meeting of the Electronic Information Communication Society of Japan, 1993 or Japanese Patent Laid-Open Application No. Heisei 4-303982. The optical modulator has a ridge type embedding structure, produced using the MOVPE (Metal Organic Vapor Phase Epitaxial) selective growth technology and does not involve etching of a semiconductor. Accordingly, the optical modulator can be anticipated as an optical modulator having a high degree of uniformity and reproducibility. The optical modulator is produced by first forming a pair of $SiO_2$ stripe masks 52 having opening area 53 therebetween on n-type InP substrate 51 as shown in FIG. 1a, selectively growing n-type InP clad layer 54, InGaAsP light absorbing layer 55 and p-type InP clad layer 56 in opening area 53 as shown in FIG. 1b by the MOVPE method, then expanding opening area 53 as shown in FIG. 1c and finally growing p-type InP embedded layer 57 (carrier concentration: $5 \times 10^{17}$ $cm^3$) and p-type InGaAs cap layer 58 as shown in FIG. 1d. The optical modulator operates so that, when a reverse bias voltage is applied, a light absorption curve in the proximity of a fundamental absorption end of the light absorbing layer is shifted to the longer wavelength side (lower energy side) by the F-K effect to extinguish the layer light.

Figure 2A:
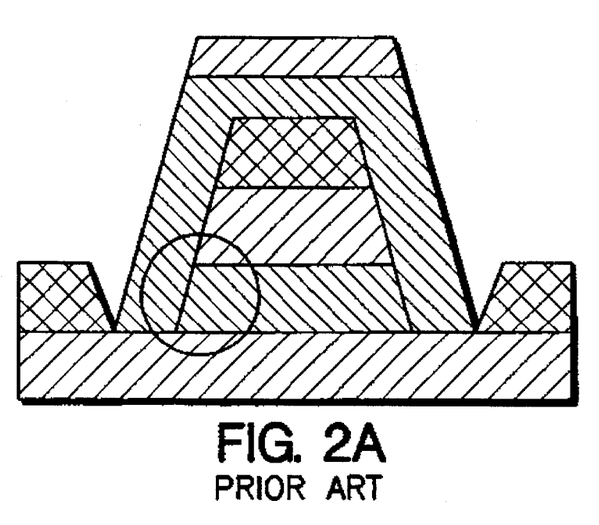
FIG. 2 is a view illustrating a problem of the prior art.
Figure 2B:
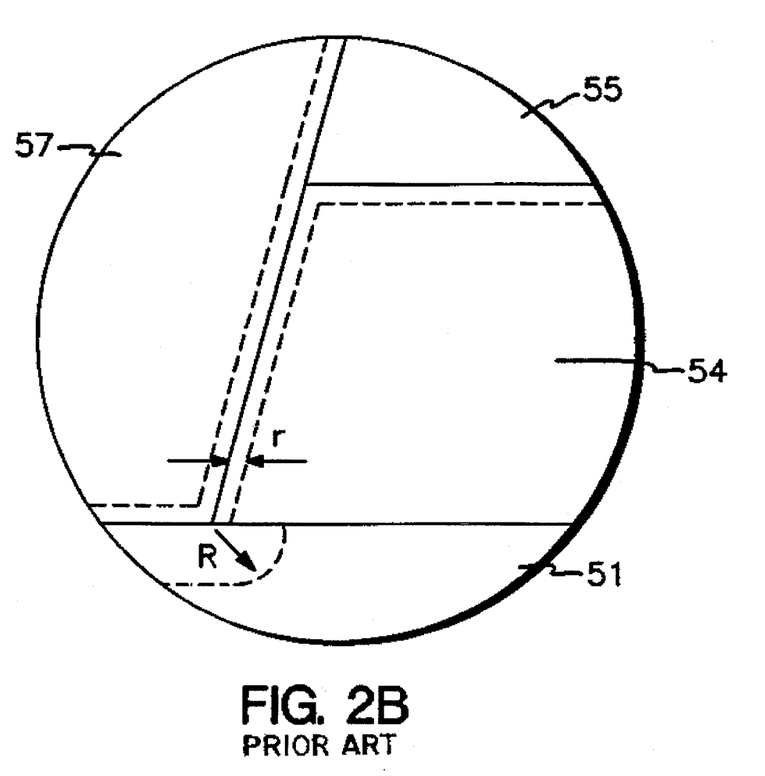

In order to improve the extinction characteristic of the optical modulator, the intensity of the electric field applied to light absorbing layer 55 must be increased to increase the wavelength shift amount. To this end, in the conventional optical modulator having the structure described above, the carrier intensities of n-type InP clad layer 54 and p-type InP clad layer 56 between which light absorbing layer 55 is held are set high (carrier concentration: $5 \times 10^{17}$ $cm^{-3}$) to increase the electric field intensity. Meanwhile, in order to reduce the capacitance of the device, the carrier concentration of n-type InP substrate 51 is set to $2 \times 10^{17}$ $cm^{-3}$. Consequently, a concentration difference appears at a growth interface between substrate 51 and n-type InP clad layer 54. In this instance, if a reverse bias voltage is applied to the device, the carrier concentration exhibits a difference across the growth interface and the extent of a depletion layer is different across the growth interface and creates a discontinuous portion as seen in FIG. 2. In the conventional optical modulator, depletion layer width r of n-type InP clad layer 54 is 640 angstrom at a carrier concentration of $5 \times 10^{17}$ $cm^{-3}$ while depletion layer width R of n-type InP substrate 51 is 1,210 angstrom at another carrier concentration of $2 \times 10^{17}$ $cm^{-3}$, and a difference of about 600 angstrom appears between them. Accordingly, the conventional optical modulator has a problem in that an edge breakdown occurs at a portion where a depletion layer exhibits a change in width, and the edge breakdown degrades the voltage resistance of the device.

SUMMARY OF THE INVENTION

It is a first object of the present invention to provide an optical modulator which solves the problem described above.

Meanwhile, the principle of operation of an optical modulator of the electric field absorbing type makes use of a phenomenon (Franz-Keldysh effect) wherein, when a reverse bias voltage is applied to the device, the band structure of the device is influenced by the reverse bias voltage so that the light absorption curve in the proximity of a fundamental absorption end is shifted to the lower energy side (longer wavelength side). Accordingly, the extinction performance depends upon the intensity of the electric field applied to the light absorbing layer. In order to increase the electric field intensity, the carrier concentration of the clad layers between which the light absorbing layer is held must be set sufficiently high. With the structure of the conventional optical modulator, however, it is impossible to make the carrier concentration of highly-doped p-type InP layer 57 of the embedded layer higher than $5 \times 10^{17}$ $cm^{-3}$ since reduction of the voltage resistance by a leak path by automatic doping (diffusion of Zn of the p-type dopant) must be prevented. Consequently, the conventional optical modulator of the electric field absorbing type has a problem in that the resistance of highly-doped p-type InP layer 57 cannot be set low, and when a reverse bias voltage is applied, a great voltage drop is produced by an influence of photo-current and decreases the electric field applied to light absorbing layer 55, resulting in reduction of the extinction ratio.

Further, in order to realize a high speed response higher than 1 Gbit/sec, the device must have a low capacitance. However, the conventional optical modulator of the electric field absorbing type has another problem in that, if the carrier concentration of highly-doped p-type InP layer 57 of the embedded layer is increased in order to improve the extinction characteristic, then the width of a depletion layer in a homozygous area of highly-doped InP layer 57 of the embedded layer and n-type InP substrate 51 described above are decreased, resulting in increase of the capacitance of the device.

It is a second object of the present invention to realize an optical modulator which solves the problems described above.

In accordance with a first form of the present invention, an optical modulator having an oxide film formed as a growth inhibiting film on a compound semiconductor substrate of a first conduction type, a double heterostructure including a clad layer of the first conduction type, a light absorbing layer and a clad layer of a second conduction type successively formed in an opening of the oxide film, and an embedding structure for covering over the entire double heterostructure, is characterized in that the carrier concentration of the clad layer of the first conduction type exhibits a continuous variation from the semiconductor substrate to the light absorbing layer.

In accordance with a second form of the present invention, an optical modulator having an oxide film formed as a growth inhibiting film on a compound semiconductor substrate of a first conduction type, a double hetero structure including a clad layer of the first conduction type, a light absorbing layer and a clad layer of a second conduction type successively formed in an opening of the oxide film, and an embedding structure for covering over the entire double heterostructure, is characterized in that the carrier concentration of the clad layer of the first conduction type exhibits a stepwise variation from the semiconductor substrate to the light absorbing layer.

In any of the optical modulators described above, the compound semiconductor substrate may be an InP substrate, and the clad layers of the first and second conduction types may be InP clad layers while the light absorbing layer may be an InGaAsP light absorbing layer.

In accordance with a third form of the present invention, an optical modulator having a pair of oxide film stripes formed as a growth inhibiting layer on a compound semiconductor substrate of a first conduction type, a mesa stripe of a double heterostructure including a clad layer of the first conduction type, a light absorbing layer and a clad layer of a second conduction type formed successively in an opening between the oxide film stripes, and an embedding structure of the second conduction type for covering over the entire mesa stripe, is characterized in that the carrier concentration of the embedding structure portion has a two-layer structure in which it exhibits a variation from a low concentration to a high concentration.

In accordance with a fourth form of the present invention, an optical modulator having a pair of oxide film stripes formed as a growth inhibiting layer on a compound semiconductor substrate of a first conduction type, a mesa stripe of a double heterostructure including a clad layer of the first conduction type, a light absorbing layer and a clad layer of a second conduction type formed successively in an opening of between the oxide film stripes, and an embedding structure of the second conduction type for covering over the entire mesa stripe, is characterized in that the carrier concentration of the embedding structure portion has a two-layer structure in which it exhibits a variation from a low concentration to a high concentration, and the carrier concentration of the clad layer of the first conduction type exhibits a stepwise variation.

A method of producing an optical modulator, in accordance with a first form of the present invention, which comprises the first step of forming a pair of oxide film stripes as a growth inhibiting film on a compound semiconductor substrate of a first conduction type, the second step of forming a mesa stripe of a double heterostructure including a clad layer of the first conduction type, a light absorbing layer and a clad layer of a second conduction type successively in an opening between the oxide film stripes by selective growth, the third step of partially removing the opposing insides of the oxide film stripes to expose part of the semiconductor substrate, and the fourth step of forming an embedding structure of the second conduction type so as to cover over the entire mesa stripe by selective growth, is characterized in that the embedding structure portion is formed, at the fourth step, so that the carrier concentration thereof exhibits a variation from a low concentration to a high concentration.

A method of producing an optical modulator, in accordance with a second form of the present invention, which comprises the first step of forming a pair of oxide film stripes as a growth inhibiting film on a compound semiconductor substrate of a first conduction type, the second step of forming a mesa stripe of a double heterostructure including a clad layer of the first conduction type, a light absorbing layer and a clad layer of a second conduction type successively in an opening between the oxide film stripes by selective growth, the third step of partially removing the opposing insides of the oxide film stripes to expose part of the semiconductor substrate, and the fourth step of forming an embedding structure of the second conduction type so as to cover over the entire mesa stripe by selective growth, is characterized in that the embedding structure portion is formed, at the fourth step, so that the carrier concentration thereof exhibits a variation from a low concentration to a high concentration, and at the second step, the clad layer of the first conduction type is formed so that the carrier concentration thereof exhibits a stepwise variation.

With the optical modulator in accordance with the first or second form of the present invention, since the carrier concentration of the clad layer of the first conduction type exhibits a continuous or stepwise variation from the semiconductor substrate to the light absorbing layer, the widths of a depletion layer in the substrate and the clad layer in the proximity of a joined portion between them can be made substantially equal to each other. Consequently, the frequency in occurrence of an edge breakdown is reduced and the voltage resistance is improved.

With the optical modulator in accordance with the third or fourth form of the present invention, since the carrier concentration of the embedding structure portion has a two-layer structure in which it varies from a low concentration to a high concentration, the resistance of the embedding structure portion is reduced. Consequently, the electric field applied to the light absorbing layer is increased and the extinction characteristic is improved.

DETAILED DESCRIPTION OF THE PREFERRED EMBODIMENTS

Embodiments of the present invention are described below with reference to the drawings.

First Embodiment

Figure 3:
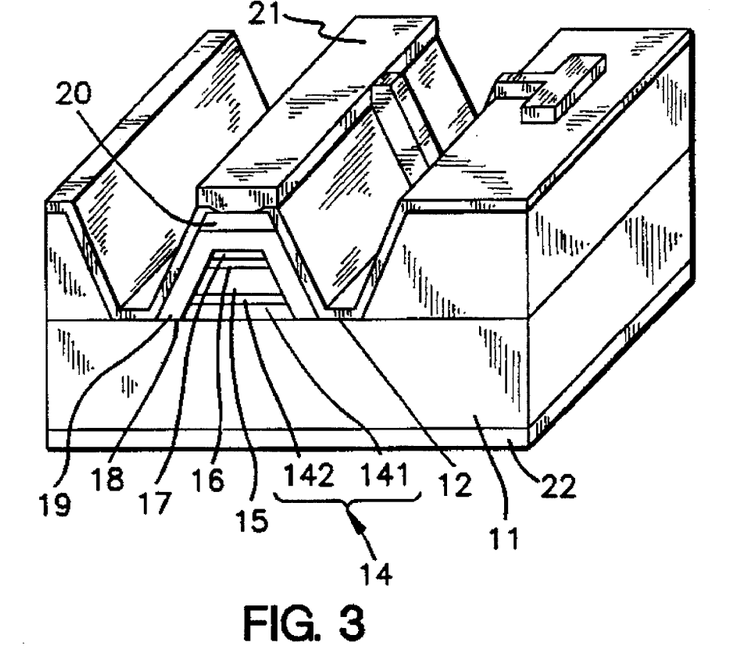
FIG. 3 is a perspective view showing the construction of a first embodiment of the present invention.

FIG. 3 is a perspective view showing the construction of the first embodiment of an optical modulator of the present invention, and FIGS. 4a to 4d are sectional views showing different steps of production of the first embodiment of the present invention.

The optical modulator shown in FIG. 3 includes n-type InP substrate 11, a pair of SiO$_2$ stripe masks 12, n-type InP clad layer 14 formed from n-type InP clad layer 141 and n-type InP clad layer 142, undoped InGaAsP light absorbing layer 15, undoped InGaAsP spacer layer 16, p-type InP clad layer 17, p-type InP embedded layer 19, p-type InGaAs cap layer 20, p electrode 21 and n electrode 22. It is to be noted that reference numeral 18 in FIG. 3 shows an opening area.

In the optical modulator of the present embodiment, the carrier concentration of n-type InP clad layer 141 exhibits a continuous variation.

The structure of the optical modulator of the present embodiment is described in more detail together with the method of producing the optical modulator.

Figure 4A:
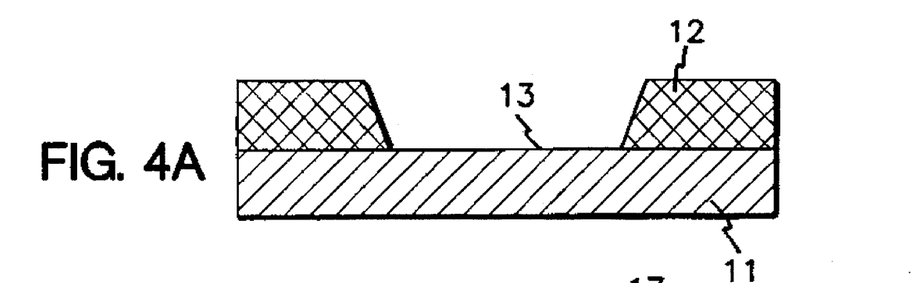
FIGS. 4a to 4d are sectional views showing different steps of production of the first embodiment of the present invention.

First, a pair of SiO$_2$ stripe masks 12 of SiO$_2$ of 3,500 angstrom thick having opening area 13 of 1.5 μm wide therebetween are formed on n-type InP substrate 11 (carrier concentration: $2 \times 10^{17}$ cm$^{-3}$) as shown in FIG. 4a by a thermal CVD method.

Figure 4B:
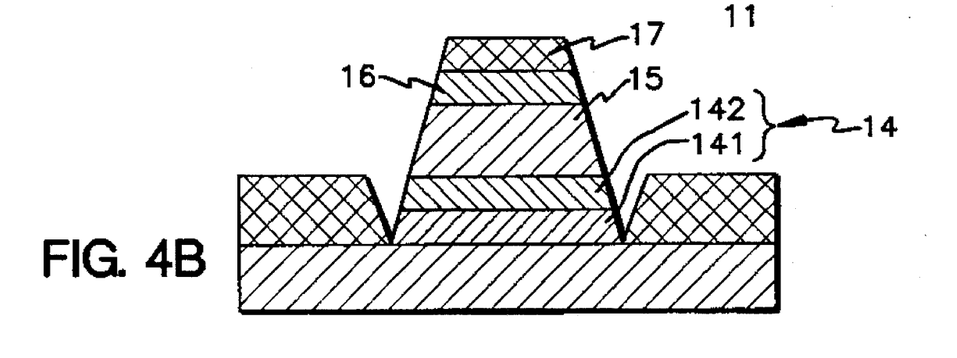

Then, n-type InP clad layer 141 of 700 angstrom thick whose carrier concentration continuously varies from $2 \times 10^{17}$ cm$^{-3}$ to $5 \times 10^{17}$ cm$^{-3}$, n-type InP clad layer 142 of 300 angstrom thick whose carrier concentration is $5 \times 10^{17}$ cm$^{-3}$, light absorbing layer 15 (wavelength composition: 1.46 μm) of undoped InGaAsP of 2,500 angstrom thick, spacer layer 16 of undoped InGaAsP of 500 angstrom thick and clad layer 17 of p-type InP of 1,000 angstrom thick whose carrier concentration is $5 \times 10^{17}$ cm$^{-3}$ are selectively and successively grown in opening area 13 as shown in FIG. 4b by a MOVPE method. Clad layer 141 and clad layer 142 constitute n-type InP clad layer 14.

Figure 4C:
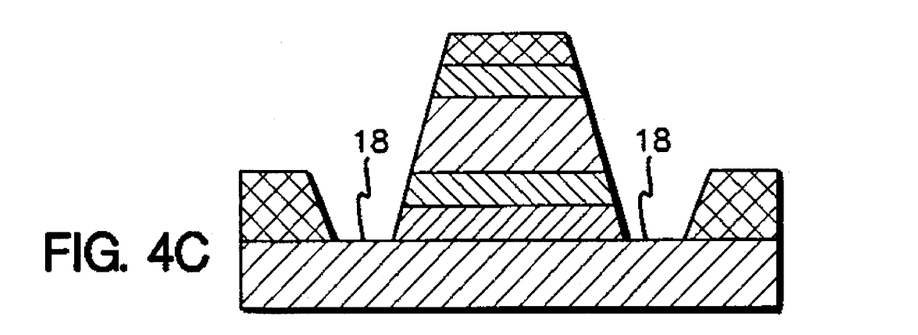

Thereafter, SiO$_2$ stripe masks 12 on the opposite sides of the selective growth area are removed by about 2 μm to expand the selective growth area by chemical etching to form a pair of opening areas 18 as shown in FIG. 4c.

Figure 4D:
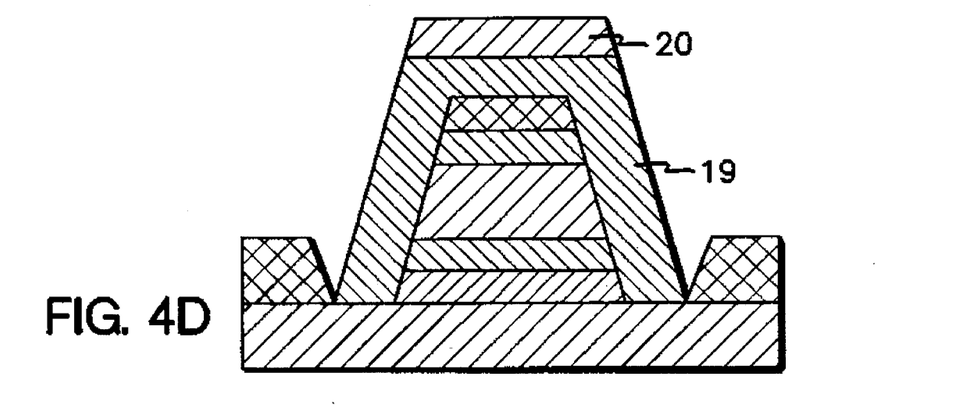

Then, p-type InP embedded layer 19 (carrier concentration: $5 \times 10^{17}$ cm$^{-3}$) is selectively grown to the thickness of 1.2 μm (thickness from the top of p-type InP clad layer 17) and p-type InGaAs cap layer 20 is selectively grown to 0.2 μm as shown in FIG. 4d both by a MOVPE method.

Figure 5A:
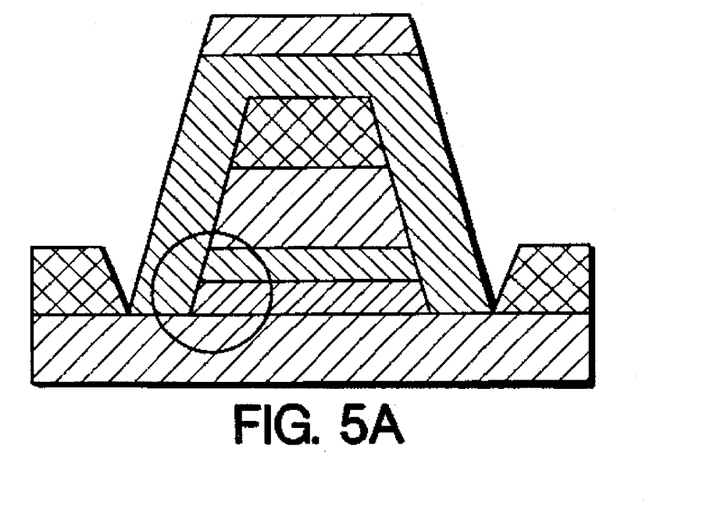
FIG. 5 is a view schematically illustrating a condition of a depletion layer in the proximity of a growth interface in the first embodiment of the present invention when a reverse voltage is applied.
Figure 5B:
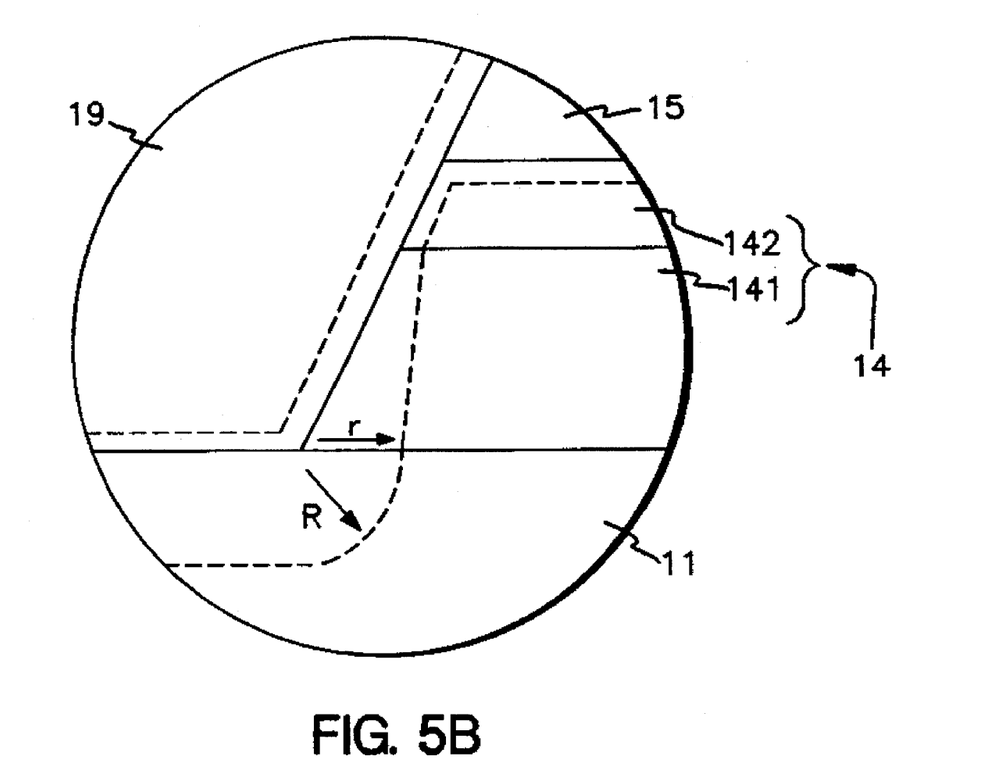

The condition of a depletion layer in the proximity of a growth interface in the optical modulator having the construction described above when a reverse voltage is applied is schematically shown in FIG. 5. Broken lines in FIG. 5 indicate ends of the depletion layer in the individual areas. In the present embodiment, the carrier concentration of n-type InP clad layer 14 continuously increases from n-type InP substrate 11 side to InGaAsP light absorbing layer 15 side.

When a reverse bias voltage is applied, width r of the depletion layer at a lowermost portion of n-type InP clad layer 14 is substantially equal to width R of the depletion layer at an upper portion of n-type InP substrate 11. Therefore, the distribution of the extent of the depletion layer can be made smooth, and consequently, an otherwise possible breakdown at the growth interface between area 51 and area 54 (refer to FIG. 2) described in the prior art can be prevented and a high voltage resistance can be obtained.

As a result, while the voltage resistance of the conventional optical modulator is 5 to 6 V, a high voltage resistance higher than 10 V was obtained with an optical modulator of a prototype produced in accordance with the present embodiment.

Meanwhile, since n-type InP clad layer 14 has a sufficiently high carrier concentration in an area thereof adjacent light absorbing layer 15, the electric field intensity of the absorbing layer exhibited a very small amount of reduction and the extinction characteristic was not degraded.

Second Embodiment

Figure 6A:
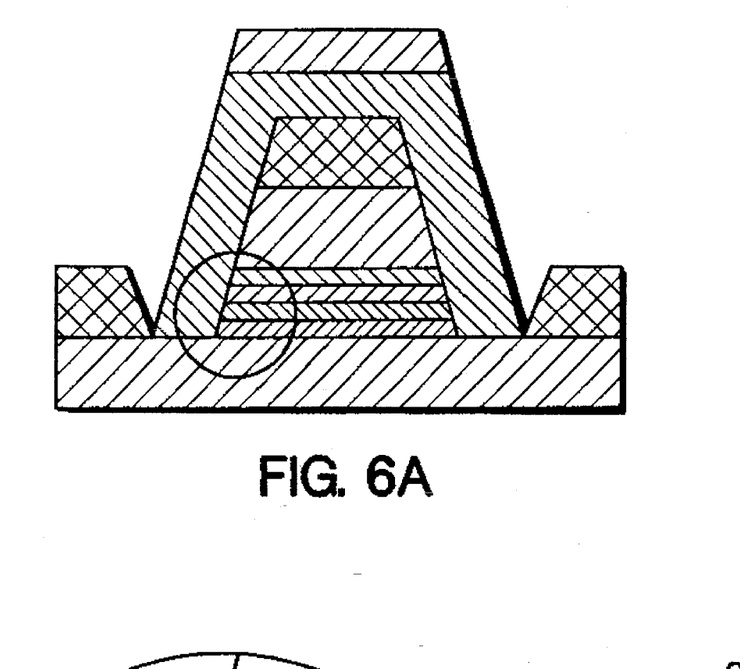
FIG. 6 is a sectional view showing the construction of a second embodiment of the present invention.
Figure 6B:
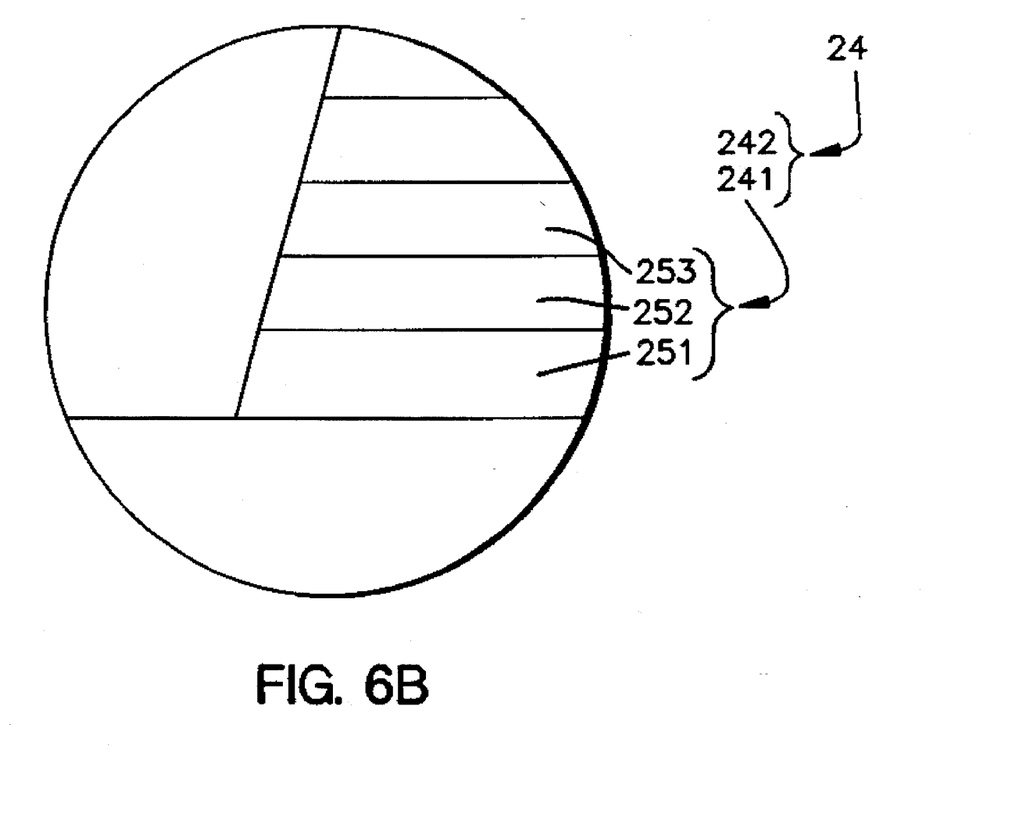

FIG. 6 is a sectional view showing the construction of the second embodiment of an optical modulator of the present invention.

The present embodiment is different from the first embodiment in that the carrier concentration of n-type InP clad layer 241 exhibits three stages of variation. For example, n-type InP clad layer 241 is formed from three stages of n-type InP clad layer 251 of a carrier concentration of $2 \times 10^{17}$ cm$^{-3}$ (300 angstrom thick), n-type InP clad layer 252 of another carrier concentration of $3 \times 10^{17}$ cm$^{-3}$ (200 angstrom thick) and n-type InP clad layer 253 of a further carrier concentration of $4 \times 10^{17}$ cm$^{-3}$ (200 angstrom thick) so as to vary the carrier concentration stepwise. Consequently, similarly to the first embodiment, the edge breakdown was successfully suppressed and a high voltage resistance was obtained. While the carrier concentration of area 141 in the first embodiment is varied continuously, similar effects were obtained also by the stepwise variation of the carrier concentration in this manner. It is to be noted that, in FIG. 6, reference numeral 242 denotes an n-type InP clad layer whose carrier concentration is fixed, and clad layer 241 and clad layer 242 constitute n-type InP clad layer 24.

While the two embodiments described above employ an n-type substrate, similar effects can be anticipated also with devices which employ a p-type substrate.

Third Embodiment

Figure 7:
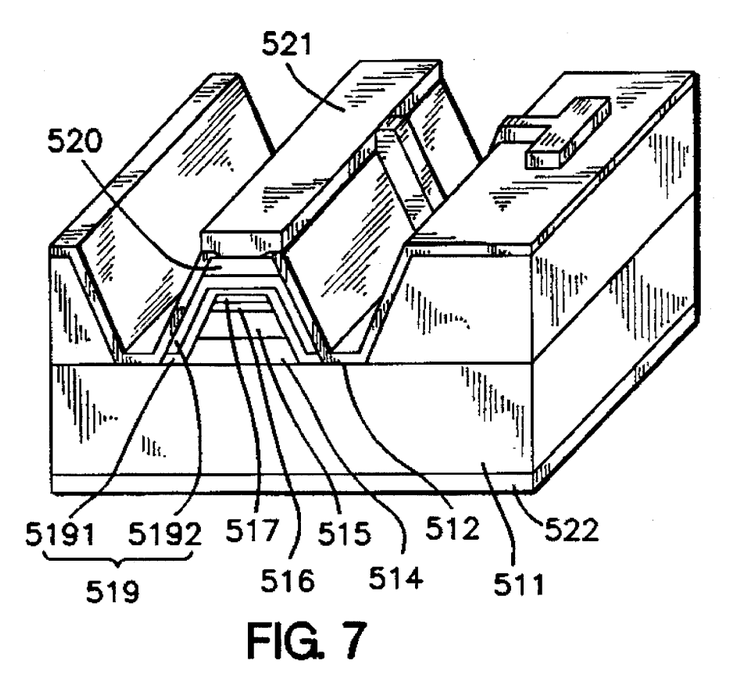
FIG. 7 is a perspective view showing the construction of a third embodiment of the present invention.

FIG. 7 is a perspective view showing the construction of the third embodiment of an optical modulator of the present invention, and FIGS. 8a to 8d are sectional views illustrating different steps of producing the third embodiment of the present invention.

The optical modulator shown in FIG. 7 includes n-type InP substrate 511, a pair of SiO$_2$ stripe masks 512, n-type InP clad layer 514, undoped InGaAsP light absorbing layer 515, undoped InGaAsP spacer layer 516, p-type InP clad layer 517, p-type InP embedded layer 519 formed from p-type InP embedded layer 5191 and p-type InP embedded layer 5192, p-type InGaAs cap layer 520, p electrode 521 and n electrode 522.

In the optical modulator of the present embodiment, the carrier concentration of p-type InP embedded layer 5191 is lower than the carrier concentration of p-type InP embedded layer 5192.

The structure of the optical modulator of the present embodiment is described in more detail with reference to FIGS. 8a to 8d together with the method of producing the optical modulator.

Figure 8A:
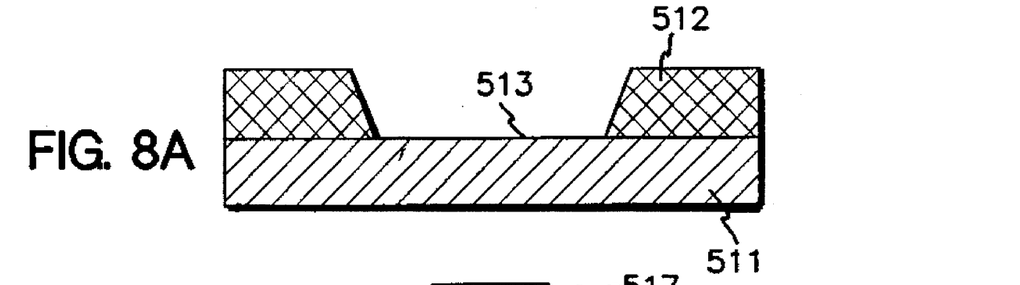
FIGS. 8a to 8c are sectional views showing different steps of production of the third embodiment of the present invention.

First, a pair of SiO$_2$ stripe masks 512 of SiO$_2$ of 3,500 angstrom thick having opening area 513 of 1.5 μm wide therebetween are formed on n-type InP substrate 511 (carrier concentration: $2 \times 10^{17}$ cm$^{-3}$) as shown in FIG. 8a by a thermal CVD method.

Figure 8B:
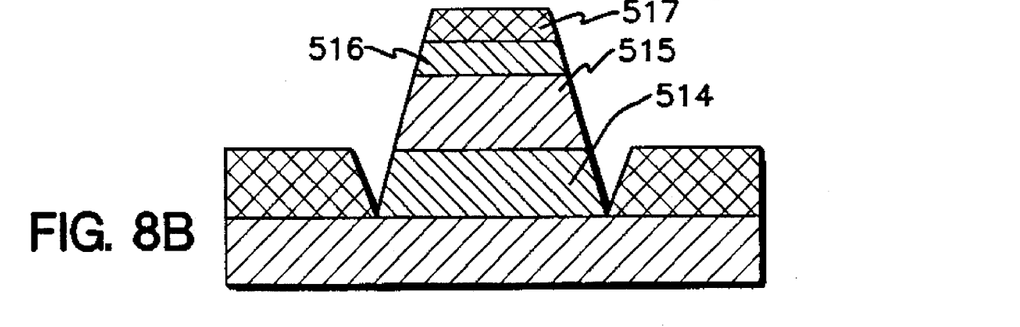

Then, n-type InP clad layer 514 of 1,000 angstrom thick whose carrier concentration is $5\times10^{17}$ cm$^{-3}$, light absorbing layer 515 (wavelength composition: 1.47 μm) of undoped InGaAsP of 2,500 angstrom thick, spacer layer 516 of undoped InGaAsP of 500 angstrom thick and p-type InP clad layer 517 of 1,000 angstrom thick whose carrier concentration is $5\times10^{17}$ cm$^{-3}$ are selectively and successively grown in opening area 513 as shown in FIG. 8b by a MOVPE method.

Figure 8C:
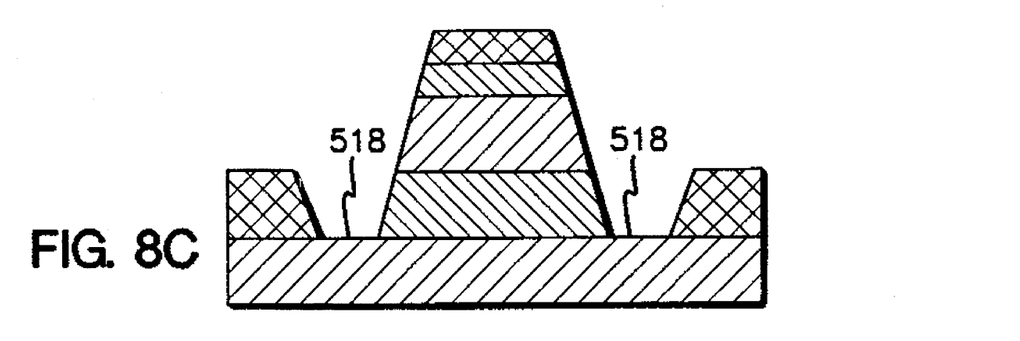
Figure 8D:
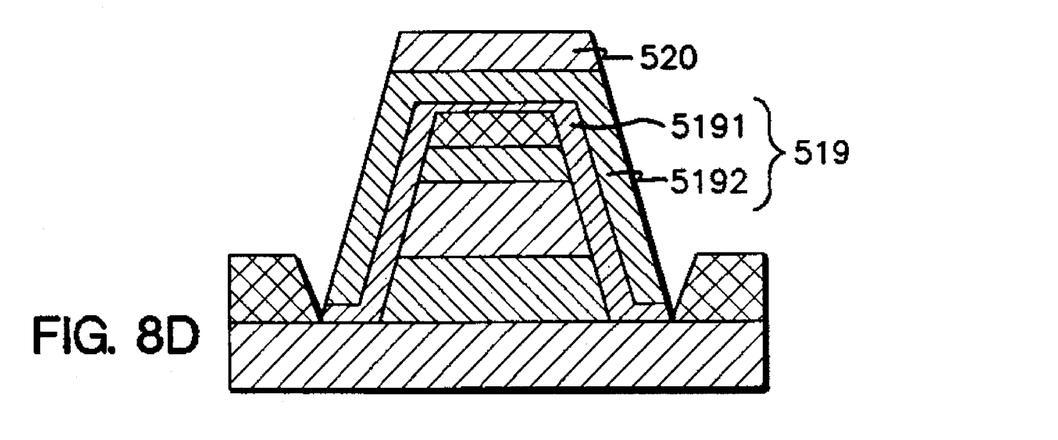

Thereafter, SiO$_2$ stripe masks 512 on the opposite sides of the selective growth area are removed by about 2 μm by chemical etching to form a pair of opening areas 518 as shown in FIG. 8c.

Then, embedded layer 5191 (carrier concentration: $1\times10^{17}$ cm$^{-3}$) of p-type InP of 0.3 μm thick (thickness from the top of p-type InP clad layer 517), embedded layer 5192 (carrier concentration: $1\times10^{18}$ cm$^{-3}$) of p-type InP of 0.9 μm thick and cap layer 520 of p-type InGaAs of 0.2 μm thick are selectively and successively grown as shown in FIG. 4d by a MOVPE method.

Figure 9A:
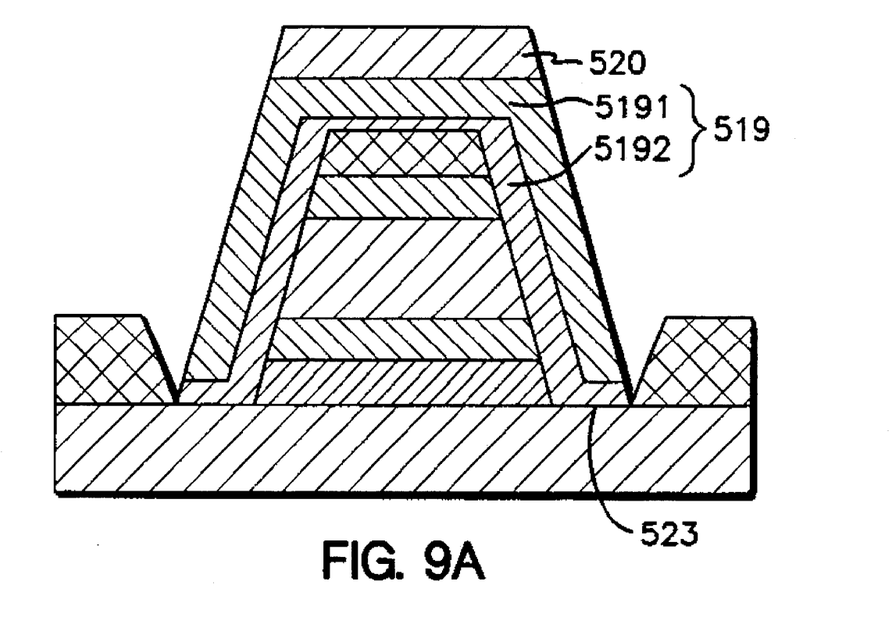
FIG. 9 is a view illustrating the principle of operation of the third embodiment of the present invention.
Figure 9B:
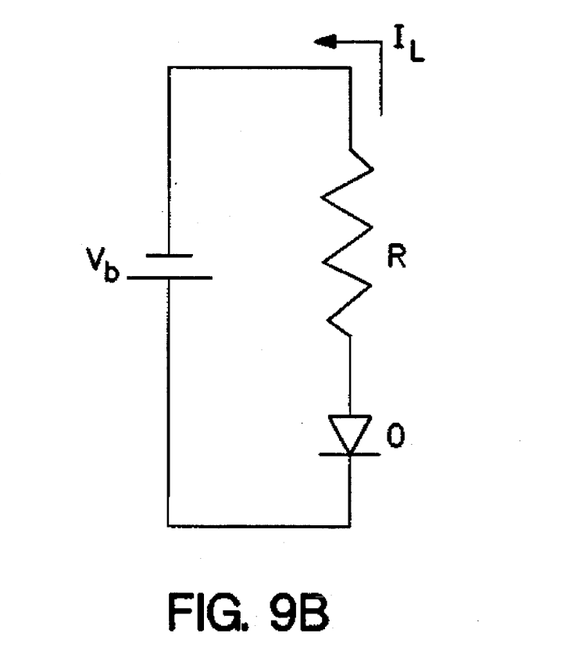

The principle of operation of the present embodiment having the construction described above is described below with reference to FIGS. 9a and 9b. FIG. 9a is a sectional view showing the construction of the present embodiment, and FIG. 9b is a circuit diagram showing an equivalent circuit to the present embodiment.

When a reverse bias voltage is applied to the entire device, photo-current $I_L$ flows through the entire circuit. In the present embodiment, the carrier concentration of p-type InP embedded layer 519 is set so that it is as low as $1\times10^{17}$ cm$^{-3}$ in a portion of p-type InP embedded layer 519 having a thickness within which a depletion layer extends from any of homozygous portions 523 (embedded layer 5191) and is as high as $1\times10^{18}$ cm$^{-3}$ in an upper portion of embedded layer 519 (embedded layer 5192). Due to the construction, the resistance of embedded layer 519 can be reduced to reduce a voltage drop there, and consequently, the electric field applied to light absorbing layer O can be increased. As a result, significant improvement in extinction characteristic can be anticipated. In fact, while the prior art optical modulator has a extinction ratio of 7 to 8 dB, a high extinction ratio of 15 dB or more was obtained with an optical modulator of a prototype produced in accordance with the present embodiment.

Meanwhile, since the carrier concentration in the proximity of any of homozygous portions 523 is comparatively low, the extent of the depletion layer can be comparatively smooth. From this, a good result on the voltage resisting property can be anticipated. Further, also capacitance C of homozygous portions 523 on the opposite sides of the double heterostructure portion can be reduced (reduced by about 30% compared with that of the prior art optical modulator). Consequently, the CR time constant of the entire device can be reduced to allow a high speed response.

From the foregoing, according to the present invention, a device which has a high extinction ratio and operates at a high speed can be realized.

Fourth Embodiment

Figure 10:
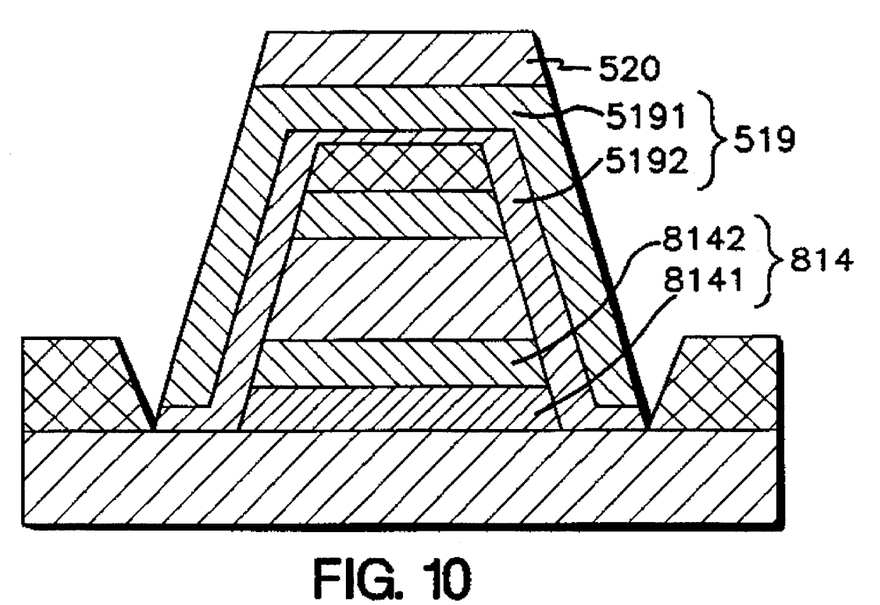
FIG. 10 is a sectional view showing the construction of a fourth embodiment of the present invention.

FIG. 10 is a sectional view showing the construction of the fourth embodiment of the present invention. The present embodiment is different from the third embodiment in that the carrier concentration of n-type InP Clad layer 514 in the third embodiment exhibits a stepwise variation. In particular, n-type InP clad layer 814 formed in opening area 513 (refer to FIG. 7) has a layered structure of n-type InP clad layer 8141 of 700 angstrom thick whose carrier concentration continuously varies from $2\times10^{17}$ cm$^{-3}$ to $5\times10^{17}$ cm$^{-3}$ and n-type InP clad layer 8142 of 300 angstrom thick whose carrier concentration is $5\times10^{17}$ cm$^{-3}$. The other construction of the present embodiment is similar to that of the third embodiment shown in FIG. 7, and the same elements are denoted by the same reference numerals as those in FIG. 7 and description thereof is omitted herein.

The present embodiment is characterized in that the device of the third embodiment which is improved in extinction characteristic has an improved voltage resistance realized by varying the carrier concentration of n-type InP clad layer 814 stepwise. The extent of a depletion layer at a growth interface between n-type InP clad layer 814 and n-type InP substrate 511 is made smooth by the concentration gradient of the carrier concentration and a breakdown at the portion is suppressed. Consequently, a device having a high voltage resistance can be realized. In fact, while the prior art optical modulator has a voltage resistance of 6 to 8 V, a high voltage resistance of 10 V or more was obtained with an optical modulator of a prototype produced in accordance with the present embodiment. Meanwhile, since the carrier concentration is sufficiently high ($5\times10^{17}$ cm$^{-3}$) in a portion of n-type InP clad layer 814 adjacent light absorbing layer 515 (n-type InP clad layer 8142), the electric field intensity applied to absorbing layer 515 is not reduced. Consequently, a high extinction ratio can be maintained.

While the carrier concentrations are specified here, they need not be restricted particularly, and similar effects can be anticipated with any structure which provides a stepwise variation in carrier concentration as described above. Further, while the embodiment here employs an n-type substrate, similar effects can be anticipated also with devices which employ a p-type substrate.

Since the present invention is constructed as described above, the following effects are anticipated.

By varying the carrier concentration of the n-type InP clad layer continuously or stepwise, there is an effect in that the extent of a depletion layer at a growth interface can be made smooth and occurrence of a breakdown there can be prevented.

Further, as a result of improvement in voltage resistance, there is another effect in that a device can be realized having a high degree of reliability and in which unexpected occurrence of deterioration of the device is eliminated.

By varying the carrier concentration of the p-type InP embedded layer stepwise, there is a further effect in that the voltage drop there can be reduced to increase the electric field applied to the light absorbing layer, improving the extinction characteristic. In fact, while the extinction ratio of the conventional optical modulator was 7 to 8 dB, a high extinction ratio of 15 dB or more was obtained with the optical modulator of the prototype produced in accordance with the present invention.

By varying the carrier concentration of the n-type InP clad layer stepwise, there is a still further effect in that a device can be obtained having such a high voltage resistance that a breakdown at a growth interface between the n-type InP clad layer and the substrate can be prevented. In fact, while the resisting voltage of the conventional optical modulator was 6 to 8 V, a high voltage resistance of 10 V or more was obtained with the optical modulator of the prototype produced in accordance with the present invention.

Further, by using the various methods, an optical modulator having the effects described above can be produced.

As apparent from the foregoing description, according to the present invention, a sufficient margin is provided to the characteristic with respect to the operating voltage and the required extinction ratio. Further, according to the present invention, since also reduction of the capacity of a device can be realized, a device which is effective to a response characteristic and is high in reliability can be realized.

The contents of the present invention are effective to various devices which employ selective growth technology including integrated devices with a light source laser.

What is claimed is:

1. An optical modulator having an oxide film formed as a growth inhibiting film on a compound semiconductor substrate of a first conduction type, a heterostructure including a clad layer of the first conduction type, a light absorbing layer and a clad layer of a second conduction type successively formed in an opening of said oxide film, and an embedding structure for covering over the entire double heterostructure, characterized in that the carrier concentration of said clad layer of the first conduction type exhibits a continuous variation from said semiconductor substrate to said light absorbing layer.

2. An optical modulator having an oxide film formed as a growth inhibiting film on a compound semiconductor substrate of a first conduction type, a double heterostructure including a clad layer of the first conduction type, a light absorbing layer and a clad layer of a second conduction type successively formed in an opening of said oxide film, and an embedding structure for covering over the entire double heterostructure, characterized in that the carrier concentration of said clad layer of the first conduction type exhibits a stepwise variation from said semiconductor substrate to said light absorbing layer.

3. An optical modulator as claimed in claim 1, characterized in that said compound semiconductor substrate is an InP substrate, and said clad layers of the first and second conduction types are InP clad layers while said light absorbing layer is an InGaAsP light absorbing layer.

4. An optical modulator as claimed in claim 2, characterized in that said compound semiconductor substrate is an InP substrate, and said clad layers of the first and second conduction types are InP clad layers while said light-absorbing layer is an InGaAsP light absorbing layer.

5. An optical modulator having a pair of oxide film stripes formed as a growth inhibiting layer on a compound semiconductor substrate of a first conduction type, a mesa stripe of a double heterostructure including a clad layer of the first conduction type, a light absorbing layer and a clad layer of a second conduction type formed successively in an opening between said oxide film stripes, and an embedding structure of the second conduction type for covering over the entire mesa stripe, characterized in that the carrier concentration of said embedding structure portion has a two-layer structure in which it exhibits a variation from a low concentration to a high concentration.

6. An optical modulator having a pair of oxide film stripes formed as a growth inhibiting layer on a compound semiconductor substrate of a first conduction type, a mesa stripe of a double heterostructure including a clad layer of the first conduction type, a light absorbing layer and a clad layer of a second conduction type formed successively in an opening between said oxide film stripes, and an embedding structure of the second conduction type for covering over the entire mesa stripe, characterized in that the carrier concentration of said embedding structure portion has a two-layer structure in which it exhibits a variation from a low concentration to a high concentration, and the carrier concentration of said clad layer of the first conduction type exhibits a stepwise variation.

7. A method of producing an optical modulator, which comprises the first step of forming a pair of oxide film stripes as a growth inhibiting film on a compound semiconductor substrate of a first conduction type, the second step of forming a mesa stripe of a double heterostructure including a clad layer of the first conduction type, a light absorbing layer and a clad layer of a second conduction type successively in an opening between said oxide film stripes by selective growth, the third step of partially removing the opposing insides of said oxide film stripes to expose part of said semiconductor substrate, and the fourth step of forming an embedding structure of the second conduction type so as to cover over the entire mesa stripe by selective growth, characterized in that said embedding structure portion is formed, at the fourth step, so that the carrier concentration thereof exhibits a variation from a low concentration to a high concentration.

8. A method of producing an optical modulator, which comprises the first step of forming a pair of oxide film stripes as a growth inhibiting film on a compound semiconductor substrate of a first conduction type, the second step of forming a mesa stripe of a double heterostructure including a clad layer of the first conduction type, a light absorbing layer and a clad layer of a second conduction type successively in an opening between said oxide film stripes by selective growth, the third step of partially removing the opposing insides of said oxide film stripes to expose part of said semiconductor substrate, and the fourth step of forming an embedding structure of the second conduction type so as to cover over the entire mesa stripe by selective growth, characterized in that said embedding structure portion is formed, at the fourth step, so that the carrier concentration thereof exhibits a variation from a low concentration to a high concentration, and at the second step, said clad layer of the first conduction type is formed so that the carrier concentration thereof exhibits a stepwise variation.

* * * * *